United States Patent [19]
Merenheimo et al.

[11] 3,777,832
[45] Dec. 11, 1973

[54] CHASSIS STRUCTURE FOR A MOTOR SLEIGH OR EQUIVALENT VEHICLE

[75] Inventors: Markku Merenheimo, Oulu; Manuno Ruuska, Muhos; Risto Saivisalmi, Oulu, all of Finland

[73] Assignee: Valmet Oy, Helsinki, Finland

[22] Filed: Apr. 7, 1972

[21] Appl. No.: 242,183

[30] Foreign Application Priority Data
Feb. 21, 1972 Finland ............................ 462/72

[52] U.S. Cl. ................. 180/5 R, 180/64 R, 305/24
[51] Int. Cl. ...................... B62m 27/02, B62d 55/08
[58] Field of Search .......................... 180/5 R, 64 R; 280/106.5, 104, 106; 305/24

[56] References Cited
UNITED STATES PATENTS

| | | |
|---|---|---|
| 3,483,936 | 12/1969 | Nilsson .............................. 180/5 R |
| 3,148,743 | 9/1964 | Jarvi .................................. 180/5 R |
| 2,312,071 | 2/1943 | Broadwater ....................... 180/5 R |
| 3,703,936 | 11/1972 | Padwick ............................ 180/5 R |
| 3,370,665 | 2/1968 | Stanaback ..................... 180/5 R X |
| 3,516,508 | 6/1970 | Lee ............................ 280/106 R X |

Primary Examiner—Richard J. Johnson
Attorney—Alexander Scher et al.

[57] ABSTRACT

A motor sleigh or the like having a chassis provided with an elongated spring in the direction of travel of the sleigh in the middle thereof. The ends of the spring carry supports for the wheels of the track mat. An auxiliary body has one end supported in the center of the spring and a forwardly extending part carrying the steering column.

9 Claims, 4 Drawing Figures

CHASSIS STRUCTURE FOR A MOTOR SLEIGH OR EQUIVALENT VEHICLE

The present invention concerns a chassis structure for a motor sleigh or equivalent vehicle. Closely associated with the invention are the same applicant's earlier Finnish Pat. applications No. 203/72, 204/72, 205/72 and 207/72 concerning a motor sleigh.

The drawback of the chassis structure of vehicles, and particularly of motor sleighs, belonging to prior art has been, above all, that when the aim is to achieve a spring arrangement which is as perfect with regard to its functioning as possible, which in addition to a long elastic travel also implies damping of tilt, the design has necessarily become complex when applying design ideas of prior art. Since furthermore in previous chassis structures the engine has been mounted on the rigid body, the transmission arrangements have required special devices. In motor sleighs one has been compelled to journal the traction shaft rigidly with reference to the body when using mechanical transmission, which has necessitated the employment for spring suspension of the traction side (the bow, as a rule) of a bogie, which usually is complex and increases the weight of the sleigh. The applicant's copending Finnish Pat. application No. 203/72 presents a solution aiming at elimination of this and other drawbacks. In structures of prior art the elastic travel has also been restricted by the need of maintaining the tension of the track mat.

The object of the present invention is to avoid the drawbacks outlined above and to achieve a chassis structure for a vehicle, in particular a motor sleigh, wherein by means of a simple design adequate elastic travel is obtained in the front and rear of the vehicle. Another object is to achieve damping of tilt by the aid of the same overall solution.

It is also an object of the invention to achieve a chassis design wherein the elastic elements are simple and light.

It is further an object of the invention to achieve a chassis structure wherein the engine and transmission shaft can be rigidly connected with each other so that, for instance when a V-belt variator is used, the wear of the V-belt would be less owing to the fact that the shafts of the primary and secondary variators cannot move with reference to each other. It is further an object to reduce the conduction of motor vibrations into the body of the vehicle.

The objects of the invention are achieved in a chassis structure which is mainly characterized in that in the chassis structure there is as an elastic element an elongated spring placed substantially symmetrically with regard to the centre-line of the vehicle in the direction of travel and by means of the torsion and bending of which elastic yielding is achieved, that to the ends of said spring the supporting and/or transmission elements of the wheels and/or track mat return wheels of the vehicle have been attached, and that said spring is connected with the elastically supported part of the vehicle substantially at the centre of the spring.

When furthermore with the characteristics specified in the foregoing certain additional solutions are combined, one obtains in a motor sleigh a simple tension adjustment of the track mat and in the case that two parallel track mats are used, separate tension adjustment of the track mats. A further advantage when a motor sleigh chassis according to the invention is used is that the chassis structure imposes no restrictions on the shaping of the body part; it is possible to mount on one and the same chassis structure various bodies differing appreciably mutually as regards design and shape. The above-mentioned advantage is due to the fact that it is possible to connect favourably with the chassis structure an auxiliary body taking up all stresses, which auxiliary body is mounted centrally within the body and to which the steering column journalling tube can be favourably attached. Among the further advantages of the invention that may be mentioned that when using a chassis structure according to the invention one may simply realize the divisibility and detachability of chassis and body, which points have been considered in greater detail in the applicant's Finnish Pat. application No. 207/72.

The invention is described in closer detail with reference to the embodiment example presented in the figures of the attached drawing.

Figure 1:
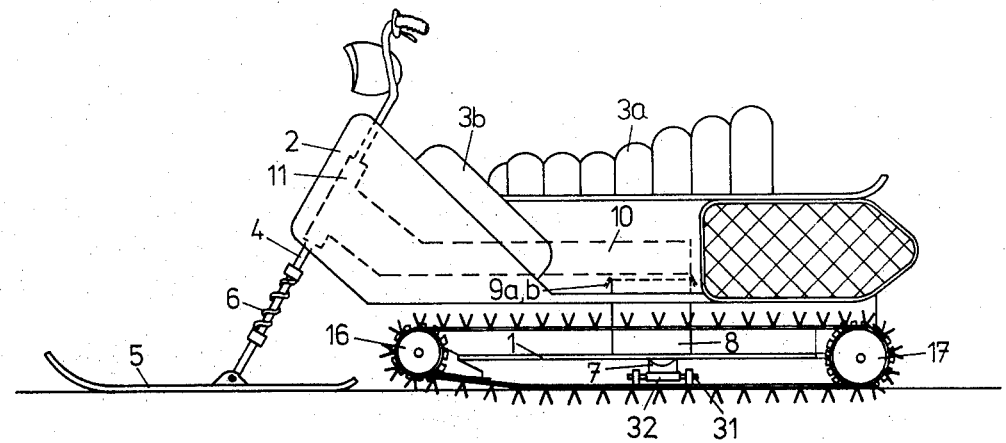
FIG. 1 shows a motor sleigh wherein the invention has been applied, in elevational view.

The motor sleigh comprises a body structure 2 with seat cushion 3a and knee rests 3b. The steering ski of the motor sleigh 5, has been pivotally attached to the lower end of the steering column 4 to swivel in the vertical plane. The steering ski 5 has been arranged to be elastically yielding in the direction of the steering column 4 against the force of the spring 6. The steering column 4 is connected with an auxiliary body consisting of the body beam 10 and sleeve 11, to which auxiliary body the body part 2 also has been attached. The sleeve 11 constitutes the bearing in which the steering column 4 is turnable.

The most essential components in the chassis structure is an elongated spring 1 acting as an elastic element, most appropriately a leaf spring made of material having suitable strength and elastic characteristics, such as reinforced plastic or a combination of reinforced plastic and wood or metal, or merely metal. The spring 1 is placed so as to lie in the direction of travel of the motor sleigh and, furthermore, substantially on the centre-line of the motor sleigh. The longitudinal spring 1 introduces a spring suspension effect both by its deflection and by its torsion. When the motor sleigh encounters an obstacle having a width equalling the total width of the track mat, the elastic action of the chassis structure is mainly caused by deflection of the spring 1, whereas in the case of a unilateral obstacle the elastic action arises from torsion of the spring 1, to which is also associated damping of the tilt. The free end of the longitudinal spring 1 is arranged to be as long as possible, whereby even a large elastic travel does not significantly affect the wheel base, and the tension of the track mat is therefore maintained unchanged.

The spring 1 may be composed equally of more than one leaf spring, placed side by side, and the front and rear ends of the spring 1 may be separate pieces, as long as they are mutually rigidly connected about the middle of the spring 1. The rigidity of the spring 1 may be made adjustable, e.g., by changing its elastic length by various means (not depicted).

Figure 2:
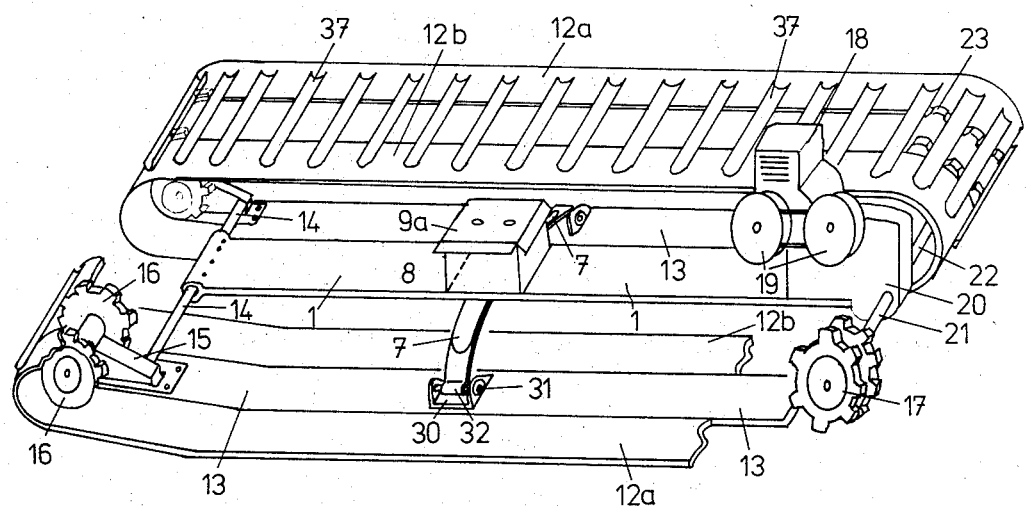
FIG. 2 shows the chassis structure of the motor sleigh according to FIG. 1 as an axonometric drawing when the body part is removed and part of the track mat is removed.
Figure 4:
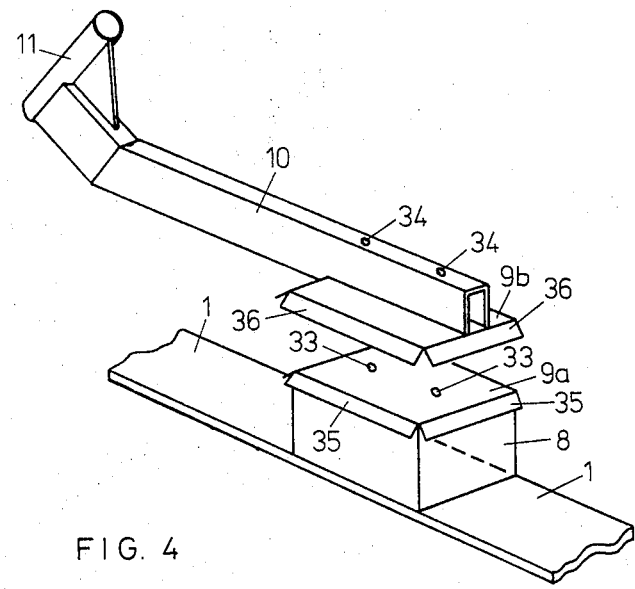
FIG. 4 shows the auxiliary body and its connection with the spring element of the chassis structure.

According to FIGS. 1, 2 and 4 to the central part of the spring 1 a box-type beam 8 has been affixed, by mediation of which the chassis structure attaches to the auxiliary body 10, 11. There may also be, for instance, two beams 8 side by side. Attached to the top side of the beam 8 is an attachment means 9a, which is plane and has bevelled side surfaces 35, and fixing holes 33. A corresponding attachment means 9b is also found at the end of the body beam 10 of the auxiliary body and this attachment means 9b, too, has bevelled, downwardly directed side surfaces 36 and holes 34 registering with the holes 33 and piercing the beam 10; screws (not depicted) passing through these holes are used to attach the auxiliary body and the body part 2 to the chassis structure.

On one end of the spring 1 the engine unit has been rigidly mounted, comprising an engine 18, a V-belt variator 19, a transmission body housing 2 and a rigid traction shaft 21, which has been journalled in the transmission body housing 20. The traction shaft 21 carries on both ends traction wheels 17 having teeth 23 which engage with the ribs 37 connecting the elastic bands 12a and 12b of the track mat.

In the motor sleigh presented here two parallel track mats are used, which run supported by the return wheels 16 and 17 and by elastic, ski-like slides 13 constituting sliding skis. The track mats consist of two parallel bands 12a and 12b and of metal ribs 37 connecting these and which do not extend quite up to the edges of the bands 12a and 12b, in order to achieve the greatest possibile bearing capacity of the track mat. The ski-like slides 13 have a width just proper to enable them to fit between the bands 12a and 12b, whereby the ribs 37 slide along the lower surface of the ski-like slides 13; experience has shown that the snow will then act as an efficient lubricant. The ski-like slides 13 rest by their central part against the central part of the spring 1 by mediation of a transverse leaf spring 7, which has been attached to the spring 1 under the beam 8. The end of the leaf spring 7 forms a loop 32, which is free to turn about the pin 31. To the ski-like slide 13 a trunnion element 30 has been attached, which has a width greater than the width of the loop 32 on the leaf spring 7, so that the ski-like slide 13 is free to move in its longitudinal direction when the tension of the track mat is adjusted.

Figure 3:
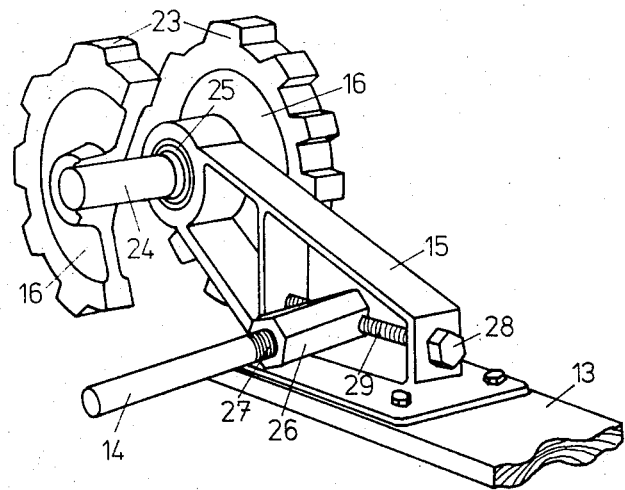
FIG. 3 shows the connection of the supporting rod belonging to the chassis structure with the journalling body of the track mat return wheel.

To the front end of the ski-like slide 13, which is somewhat raised above the plane of the rest of the slide 13, the journalling body 15 for the front return wheel 16 of the track mat has been affixed, the detailed design of this element being visible in FIG. 3. The return wheel 16 is bipartite and it has been mounted on a shaft 24 carried in the body 15 by a bearing 25. The supporting rod 14 attached to the end of the spring 1 is so connected with the journalling body 15 that the latter is free to turn about an axis parallel to the longitudinal axis of the slide 13. This has been achieved in that both ends of the supporting rod 14 carry with threads 27 a sleeve 26, which in its end has a threaded hole cooperating with a screw 28, which in its turn resides in holes provided in the journalling body 15. The journalling body 15 is free to turn in the manner described, because the sleeve 26 may turn on the threads 29 of the screw 28. By turning the screw 28 the tension of the track mat may be adjusted because the slide 13 is free to move longitudinally in its attachment 30, 31, 32 with reference to the transverse leaf spring 7. The screw 28 may be taken out altogether, and the track gauge of the mat may then be adjusted by turning the sleeve 26.

We claim:

1. A vehicle, such as a motor sleigh, comprising an elongated horizontal spring extending parallel to the direction of movement of the vehicle in the center thereof, said spring being flexible vertically and turnable about its longitudinal axis, a carriage, a seat space carried by said carriage, said carriage being mounted upon said spring in the central portion of said spring, at least one track mat, means detachably connecting said track mat with said spring, said track mat having forward return wheels and rear return wheels, means connecting said forward return wheels to the forward end of said spring, a vehicle engine, transmission means connected with said engine and means mounting said engine and said transmission means on one end of said spring, said transmission means comprising a traction shaft integrally journalled in said spring, said rear return wheels being mounted upon the ends of said traction shaft.

2. Chassis structure for motor sleigh according to claim 3, characterized in that to the spring at its end opposite to that carrying the engine (18) a supporting rod (14) has been attached transversally to the longitudinal direction of the spring (1) and that with the ends of said supporting rod (14) the journalling bodies (15) of one set of return wheels (16) of the track mat (12,37) of the motor sleigh have been connected.

3. Chassis structure for motor sleigh according to claim 4, wherein the track mat (12,37) rests against the body of the motor sleigh by mediation of ski-like slides (13), characterized in that the ski-like slides (13) rest substantially at their centre against a leaf spring (7) transversal to the spring (1) and attached by its centre substantially to the centre of the spring (1).

4. Chassis structure for motor sleigh according to claim 1, characterized in that the ski-like slides (13) have been attached to the ends (32) of the transverse leaf spring (7) in such manner that the slides are free to turn about their longitudinal axis.

5. Chassis structure for motor sleigh according to claim 6, characterized in that on one end of the ski-like slides (13) the journalling bodies (15) of the return wheels (16) of the track mat (12,37) have been mounted.

6. Chassis structure for motor sleigh according to claim 7, characterized in that the supporting rods (14) have been so attached to the journalling bodies (15) of the return wheels (16) that the supporting rod (14) and the journalling body (15) can turn with reference to each other about the longitudinal axis of the ski-like slide (13).

7. Chassis structure for motor sleigh according to claim 8, characterized in that to the end of the supporting rod (14) by threads (27) a sleeve (26) has been attached, with the end of which by threads (29) connects a screw (28), which is attached to the journalling body (15), so that by turning the sleeve (26) the track gauge of the track mat (12,37) can be adjusted and by turning the screw (28) the tension of the track mat (12,37) can be adjusted.

8. Chassis structure for motor sleigh according to claim 7, characterized in that substantially to the centre of the spring (1) a beam (8) has been affixed, which carries an attachment means (9a), and that to the body beam (10) of the motor sleigh another attachment means (9b) mating with the first attachment means (9a) has been affixed, and that the body part of the motor sleigh (2) has been attached to the body beam (10) to achieve divisibility of the chassis structure and body part (2).

9. Chassis structure for motor sleigh according to claim 8, characterized in that the body beam (10) at its end carries a sleeve (11) with which the steering column (4) of the motor sleigh is associated.

* * * * *